(12) United States Patent
Kajita et al.

(10) Patent No.: US 11,186,036 B2
(45) Date of Patent: Nov. 30, 2021

(54) ADDITIVE MANUFACTURING APPARATUS AND ADDITIVE MANUFACTURING METHOD

(71) Applicant: SINTOKOGIO, LTD., Nagoya (JP)

(72) Inventors: Kouji Kajita, Toyokawa (JP); Kazuya Kojima, Toyokawa (JP); Takaya Nakane, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 1 day.

(21) Appl. No.: 16/825,165

(22) Filed: Mar. 20, 2020

(65) Prior Publication Data

US 2020/0307084 A1 Oct. 1, 2020

(30) Foreign Application Priority Data

Mar. 29, 2019 (JP) .............................. JP2019-067294

(51) Int. Cl.
*B29C 64/241* (2017.01)
*B33Y 10/00* (2015.01)
*B33Y 30/00* (2015.01)
*B29C 64/135* (2017.01)
*B29C 64/268* (2017.01)
*B29C 64/245* (2017.01)

(52) U.S. Cl.
CPC .......... *B29C 64/241* (2017.08); *B29C 64/135* (2017.08); *B29C 64/245* (2017.08); *B29C 64/268* (2017.08); *B33Y 10/00* (2014.12); *B33Y 30/00* (2014.12)

(58) Field of Classification Search
CPC ... B29C 64/135; B29C 64/241; B29C 64/245; B29C 64/268; B33Y 10/00; B33Y 30/00
See application file for complete search history.

(56) References Cited

U.S. PATENT DOCUMENTS

2020/0156290 A1\* 5/2020 Corsmeier ......... B23K 26/0823

FOREIGN PATENT DOCUMENTS

JP 2016-203425 A 12/2016

\* cited by examiner

*Primary Examiner* — Robert J Grun
(74) *Attorney, Agent, or Firm* — Faegre Drinker Biddle & Reath LLP

(57) ABSTRACT

An additive manufacturing apparatus includes a rotating body including therein a space defined by an inner circumferential surface, a rotation drive unit causing the rotating body to rotate, a supply unit supplying slurry containing ultraviolet light curable resin to the inner circumferential surface, a first drive unit causing the supply unit to move in a radial direction of the rotating body, a flattening unit located downstream of the supply unit and flattening the slurry supplied to the inner circumferential surface of the rotating body at an end portion thereof during rotation of the rotating body to a thickness of one layer, a second drive unit causing the flattening unit to move along the radial direction of the rotating body, and an irradiation unit provided downstream of the flattening unit and spot-radiating ultraviolet light at an irradiation position determined based on a shape of the molded object.

8 Claims, 9 Drawing Sheets

ADDITIVE MANUFACTURING APPARATUS AND ADDITIVE MANUFACTURING METHOD

CROSS-REFERENCE TO RELATED APPLICATION

This application is based on Japanese Patent Application No. 2019-067294 filed with Japan Patent Office on Mar. 29, 2019, the entire contents of which are hereby incorporated by reference.

TECHNICAL FIELD

The present disclosure relates to an additive manufacturing apparatus and an additive manufacturing method.

BACKGROUND

Japanese Unexamined Patent Publication No. 2016-203425 describes a manufacturing method for manufacturing a three-dimensional molded object by lamination. In this method, a layer forming unit forms a layer on a stage and the layer is cured using binding liquid application means and ultraviolet light irradiating means. The layer forming unit, the binding liquid application means and the ultraviolet light irradiating means move above the stage in a horizontal direction.

SUMMARY

Here, the respective components such as the layer forming unit, the binding liquid application means and the ultraviolet light irradiation means in Japanese Unexamined Patent Publication No. 2016-203425 need to move above the stage in order. After movement and processing of each component are completed, the stage needs to descend for lamination. For this reason, since neither each component can move above the stage in parallel nor the stage can descend in parallel with the movement of each component, it may take time to obtain a molded object.

The present disclosure provides an additive manufacturing apparatus and an additive manufacturing method capable of improving a manufacturing speed of a molded object.

An additive manufacturing apparatus according to an aspect of the present disclosure is an additive manufacturing apparatus forming a molded object layer by layer, comprising a rotating body including therein a space defined by an inner circumferential surface and an axis of rotation extending in a direction along a center line of the inner circumferential surface, a rotation drive unit causing the rotating body to rotate around the axis of rotation, a supply unit provided inside the rotating body and supplying slurry containing ultraviolet light curable resin to the inner circumferential surface of the rotating body during rotation of the rotating body by the rotation drive unit, a first drive unit causing the supply unit to move in a radial direction of the rotating body, a flattening unit provided inside the rotating body, located downstream of the supply unit in a rotating direction of the rotating body and flattening the slurry supplied to the inner circumferential surface of the rotating body at an end portion thereof during rotation of the rotating body by the rotation drive unit to a thickness of one layer, a second drive unit causing the flattening unit to move along the radial direction of the rotating body, and an irradiation unit provided inside the rotating body, located downstream of the flattening unit in the rotating direction of the rotating body and spot-radiating ultraviolet light at an irradiation position determined based on a shape of the molded object during rotation of the rotating body by the rotation drive unit.

In the additive manufacturing apparatus, the rotating body is rotated around the axis of rotation by the rotation drive unit. During rotation of the rotating body, slurry is supplied to the inner circumferential surface of the rotating body by the supply unit. The slurry is flattened by the flattening unit downstream of the supply unit in the rotating direction of the rotating body. The slurry is irradiated with ultraviolet light downstream of the flattening unit in the rotating direction of the rotating body by the irradiation unit. The supply unit moves in a direction along the radial direction of the rotating body by the first drive unit. The flattening unit moves in the direction along the radial direction of the rotating body by the second drive unit. When the rotating body rotates in this way, slurry is pressed by a centrifugal force against the inner circumferential surface of the rotating body, which prevents the slurry from being separated from the inner circumferential surface during rotation of the rotating body. Furthermore, since the inner circumferential surface of the rotating body moves with respect to the supply unit, the flattening unit and the irradiation unit, the supply unit, the flattening unit and the irradiation unit need not move in the circumferential direction of the rotating body. Therefore, the supply unit, the flattening unit and the irradiation unit can execute processing without waiting for the movement of each component to be completed and can form layers of the molded object continuously. Moreover, the supply unit and the flattening unit can move by the first drive unit and the second drive unit at a time at which the processing by each component is completed without waiting for the processing by other components to be completed. This allows the additive manufacturing apparatus to shorten time to wait for the movement or processing of each component to be completed. Thus, according to this additive manufacturing apparatus, the manufacturing speed of the molded object can be improved.

In the embodiment, the irradiation unit may complete irradiation corresponding to one layer of the molded object after irradiation with ultraviolet light starts until the rotating body makes one rotation based on the rotation speed of the rotating body by the rotation drive unit and the irradiation position. Thus, the additive manufacturing apparatus can execute the respective processes by the supply unit, the flattening unit and the irradiation unit continuously, and can thereby improve the manufacturing speed of the molded object.

In the embodiment, the irradiation unit may change the position of the irradiation point of ultraviolet light based on the rotation speed of the rotating body by the rotation drive unit and the irradiation position for every rotation of the rotating body along a center line of the inner circumferential surface of the rotating body and complete irradiation corresponding to one layer of the molded object. In this case, the irradiation unit may not change the position of the irradiation point of ultraviolet light to the direction along the center line of the inner circumferential surface of the rotating body according to the irradiation position after irradiation with ultraviolet light starts until the rotating body makes one rotation. This allows the additive manufacturing apparatus to reduce the time required to change the position of the irradiation point of ultraviolet light at the irradiation unit.

In the embodiment, the additive manufacturing apparatus may further comprise a nozzle provided inside the rotating body and supplying a liquid or gas toward the inner circumferential surface of the rotating body. Uncured slurry and the molded object are disposed on the inner circumferential surface of the rotating body. The liquid or gas supplied from the nozzle is supplied to the uncured slurry and the molded object. Since the uncured slurry has higher fluidity than the molded object, it is separated from the molded object by the supplied liquid or gas. Furthermore, when the rotating body rotates, a centrifugal force is applied to the uncured slurry, which further increases the fluidity, making the uncured slurry more easily separable from the molded object. Even when the molded object has a complicated shape, when the rotating body rotates, the centrifugal force makes it easier for the supplied liquid or gas to penetrate into small parts of the molded object, thus reducing man-hours in a cleaning step of the molded object. In this way, the present additive manufacturing apparatus can easily extract the molded object alone from the inner circumferential surface of the rotating body.

An additive manufacturing method according to another aspect of the present disclosure is an additive manufacturing method forming a molded object layer by layer, comprising a step of causing a rotating body including therein a space defined by an inner circumferential surface and an axis of rotation extending in a direction along a center line of the inner circumferential surface to rotate around the axis of rotation, a step of supplying slurry containing ultraviolet light curable resin to the inner circumferential surface of the rotating body during rotation of the rotating body, a step of flattening the slurry supplied to the inner circumferential surface of the rotating body in the step of supplying during rotation of the rotating body to a thickness of one layer, and a step of spot-irradiating the slurry flattened on the inner circumferential surface of the rotating body in the step of flattening during rotation of the rotating body with ultraviolet light at an irradiation position determined based on a shape of the molded object.

According to this additive manufacturing method, in the step of rotating, the rotating body rotates around the axis of rotation. In the step of supplying, the slurry is supplied to the inner circumferential surface of the rotating body during rotation of the rotating body. In the step of flattening, the supplied slurry is flattened to a thickness corresponding to one layer during rotation of the rotating body. In the step of irradiating, the flattened slurry is irradiated with ultraviolet light during rotation of the rotating body. Thus, when the rotating body rotates, slurry is pressed by a centrifugal force against the inner circumferential surface of the rotating body, which prevents the slurry from being separated from the inner circumferential surface during rotation of the rotating body. Furthermore, since the inner circumferential surface of the rotating body moves with respect to the position at which slurry is supplied in the step of supplying, the position of flattening in the step of flattening and the position at which ultraviolet light is radiated in the step of irradiating, the respective positions need not be moved in the circumferential direction of the rotating body. For this reason, in each step, it is possible to form layers of a molded object continuously without changing the position of processing in each step. In this way, the present additive manufacturing method can shorten the time to wait for completion of movement or processing of each component. Thus, according to the present additive manufacturing method, it is possible to improve the manufacturing speed of the molded object.

The additive manufacturing apparatus and the additive manufacturing method according to the present disclosure can improve the manufacturing speed of the molded object.

DETAILED DESCRIPTION

Figure 1:
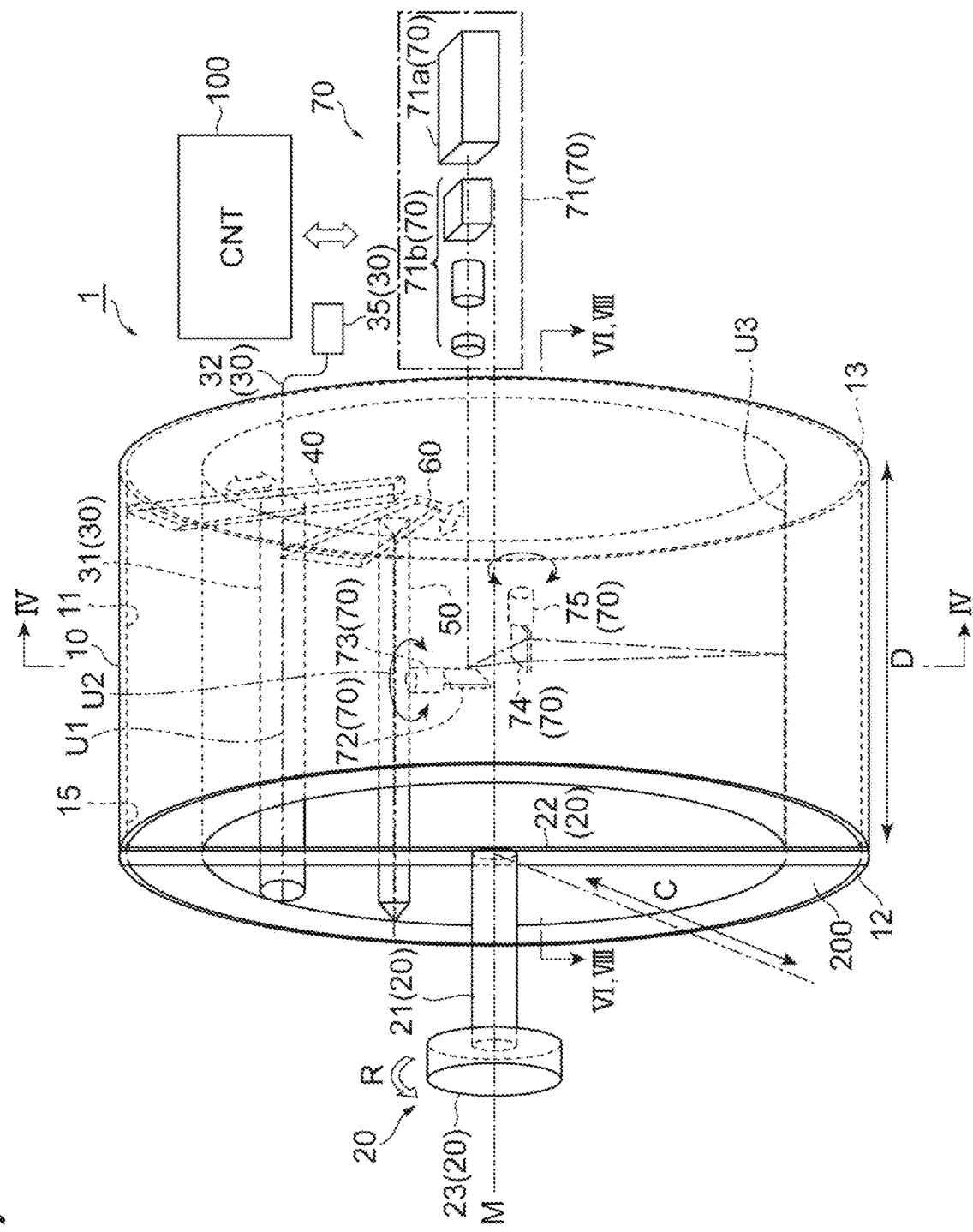
FIG. 1 is a schematic view illustrating an example of an additive manufacturing apparatus according to a first embodiment.

Hereinafter, embodiments of the present disclosure will be described with reference to the accompanying drawings. Note that in the following description, identical or corresponding elements are assigned the same reference numerals and duplicate description will not be repeated. Dimensional ratios among the drawings do not always coincide with the described ones. Terms "up," "down," "left" and "right" are based on the illustrated states, and are for convenience.

First Embodiment

FIG. 1 is a schematic view illustrating an example of an additive manufacturing apparatus according to an embodiment. The additive manufacturing apparatus 1 shown in FIG. 1 is an apparatus forming a molded object layer by layer. The additive manufacturing apparatus 1 is provided with a rotating body 10, a rotation drive unit 20, a supply unit 30, a first drive unit 40, a flattening unit 50, a second drive unit 60, an irradiation unit 70 and a controller 100. The additive manufacturing apparatus 1 forms a molded object layer by layer on an inner circumferential surface 11 of the rotating body 10 rotated by the rotation drive unit 20. More specifically, the supply unit 30 supplies slurry to the inner circumferential surface 11 of the rotating body 10 and forms a layer 200 of the slurry, the flattening unit 50 flattens the layer 200 of the slurry, and the irradiation unit 70 irradiates the layer 200 of the slurry with ultraviolet light and cures the layer 200 of the slurry to form a layer of the molded object. The first drive unit 40 adjusts a relative distance between the inner circumferential surface 11 of the rotating body 10 and the supply unit 30. The second drive unit 60 adjusts relative distances of the inner circumferential surface 11 of the rotating body 10 from the flattening unit 50. The slurry is a base material of the molded object. The slurry is, for example, a fluid material in which ultraviolet light curable resin and ceramic powder or metal powder are mixed. The slurry may be gel-like, semi-solid, jelly-like, mousse-like or paste-like resin. The ultraviolet light curable resin is resin that cures by receiving ultraviolet light, and is, for example, acrylic or epoxy-based.

The rotating body 10 includes a space 15 defined by the inner circumferential surface 11. The inner circumferential surface 11 is cylindrical. A slurry layer 200 is formed on the inner circumferential surface 11. The supply unit 30, the flattening unit 50 and the irradiation unit 70 are housed in the space 15 in the rotating body 10. The rotating body 10 is, for example, a cylindrical member. The rotating body 10 has, for example, an annular left end face 12 and an annular right end face 13 parallel to the left end face 12. The inner circumferential surface 11 is connected to the left end face 12 and the right end face 13. The rotating body 10 has an axis of rotation M extending in a direction along a center line of the inner circumferential surface 11. The center line of the inner circumferential surface 11 of the rotating body 10 is a straight line connecting the left end face 12 and the right end face 13. Hereinafter, a direction along the center line of the inner circumferential surface 11 of the rotating body 10 is assumed to be a center line direction D. The axis of rotation M extends, for example, in the center line direction D and is an axis connecting the centers of the circles of the left end face 12 and the right end face 13 of the rotating body 10.

The rotation drive unit 20 causes the rotating body 10 to rotate around the axis of rotation M. The rotation drive unit 20 is connected to the left end face 12 of the rotating body 10. The rotation drive unit 20 includes a rod 21, a beam member 22 connecting the rod 21 and the rotating body 10 and a drive source 23 driving the rod 21 to rotate. The rod 21 is provided in such a way as to be aligned with the axis of rotation M along the center line direction D. A right end portion of the rod 21 is connected to the beam member 22. A left end portion of the rod 21 is connected to the drive source 23.

The beam member 22 is connected to the left end face 12 of the rotating body 10. The beam member 22 is, for example, quadrangular prism-shaped and extends along the radial direction C. The "radial direction C" refers to a direction in which the radius of the left end face 12 extends. Both ends of the beam member 22 are connected to the left end face 12. As the rod 21 is rotated, the drive source 23 causes the rotating body 10 to rotate around the axis of rotation M via the beam member 22 connected to the rod 21. The drive source 23 is, for example, a motor. The rotating direction R which is a direction in which the rotation drive unit 20 drives the rotating body 10 to rotate is a direction in which an object disposed on the inner circumferential surface 11 of the rotating body 10 passes through a position corresponding to the supply unit 30, a position corresponding to the flattening unit 50 and a position corresponding to the irradiation unit 70 in order. That is, the supply unit 30, the flattening unit 50 and the irradiation unit 70 are provided in order from upstream of the rotating body 10 in the rotating direction R. The "corresponding positions" refer to positions at which slurry is processed by the corresponding components.

The supply unit 30 supplies slurry to the inner circumferential surface 11 of the rotating body 10 during rotation of the rotating body 10 by the rotation drive unit 20 to form a slurry layer 200. The "supply unit 30 supplying slurry during rotation of the rotating body 10" means that supply of slurry by the supply unit 30 takes place simultaneously or alternately with rotation of the rotating body 10 by the rotation drive unit 20. The supply unit 30 includes, for example, a head 31 supplying slurry, a supply source 32 supplying slurry to the head 31, and a supply pipe 33 causing the head 31 to communicate with the supply source 32.

The head 31 is provided closer to the axis of rotation M than the inner circumferential surface 11 of the rotating body 10 and extends along the center line direction D. The head 31 supplies slurry, for example, such that the inner circumferential surface of the slurry layer 200 supplied to the inner circumferential surface 11 of the rotating body 10 becomes a layer formation height position. The "layer formation height position" is a height prescribed as the height position of light radiated from the irradiation unit 70. The head 31 is separate from the inner circumferential surface 11 of the rotating body 10 in such a way as to be located, for example, at a layer formation height position.

The head 31 supplies slurry to the inner circumferential surface 11 of the rotating body 10 at the corresponding position. The head 31 linearly supplies slurry along the center line direction D, for example, from the left end face 12 to the right end face 13 of the rotating body 10. When the position of the inner circumferential surface 11 of the rotating body 10 corresponding to the head 31 is assumed to be a range U1, the head 31 supplies a predetermined amount of slurry over the range U1. Since the inner circumferential surface 11 of the rotating body 10 passes through the position corresponding to the head 31 as the rotating body 10 rotates, the head 31 can supply slurry at an arbitrary position of the inner circumferential surface 11 of the rotating body 10. Slurry is supplied from the supply source 32 through the supply pipe 33 to the head 31. The amount of slurry supplied from the head 31 is determined based on the length of the range U1, the rotation speed of the rotating body 10 or the shape of the molded object or the like. The head 31 may include a vibration function to increase fluidity of slurry.

The first drive unit 40 drives the supply unit 30 to move along the radial direction C of the rotating body 10. As an example, the first drive unit 40 drives the head 31 of the supply unit 30 to move in the radial direction C. The first drive unit 40 includes, for example, a guide rail extending in the radial direction C and a drive source. The guide rail is disposed to one side of the right end face 13 of the rotating body 10 and connected to an end portion of the head 31. The first drive unit 40 drives the head 31 of the supply unit 30 to move along the radial direction C to come closer to or separate from the inner circumferential surface 11 of the rotating body 10. The first drive unit 40 causes the head 31 to move in the radial direction C in units of one-layer thickness. The first drive unit 40 drives the head 31 to supply slurry to the inner circumferential surface 11 of the rotating body 10 at a predetermined height to faun a slurry layer 200.

During rotation of the rotating body 10 by the rotation drive unit 20, the flattening unit 50 flattens the slurry supplied to the inner circumferential surface 11 of the rotating body 10 to a thickness of one layer at an end portion thereof. The flattening unit 50 is, for example, a scraper. The "flattening unit 50 flattening slurry during rotation of the rotating body 10" means that slurry is flattened by the flattening unit 50 together with the rotation of the rotating body 10 by the rotation drive unit 20. The flattening unit 50 is located downstream of the supply unit 30 in the rotating direction R of the rotating body 10 closer to the axis of rotation M than the inner circumferential surface 11 of the rotating body 10. The flattening unit 50 extends in the center line direction D along the inner circumferential surface 11 of the rotating body 10.

An end portion of the flattening unit 50 flattens slurry on the inner circumferential surface 11 of the rotating body 10 at a position corresponding to the flattening unit 50. The flattening unit 50 linearly flattens the slurry along the center line direction D from the left end face 12 to the right end face 13 of the rotating body 10. When the inner circumferential surface 11 of the rotating body 10 at the position corresponding to the flattening unit 50 is assumed to be a "range U2," the flattening unit 50 flattens the slurry on the inner circumferential surface 11 of the rotating body 10 in the range U2. As the rotating body 10 rotates, the inner circumferential surface 11 of the rotating body 10 passes through the position corresponding to the flattening unit 50, and the flattening unit 50 can thereby flatten slurry at an arbitrary position of the inner circumferential surface 11 of the rotating body 10. The end portion of the flattening unit 50 flattens the slurry supplied from the supply unit 30 to the inner circumferential surface 11 of the rotating body 10, and one layer of the slurry layer 200 is thereby formed on the inner circumferential surface 11 of the rotating body 10.

The second drive unit 60 drives the flattening unit 50 to move along the radial direction C of the rotating body 10. The second drive unit 60 is provided downstream of the first drive unit 40 in the rotating direction R of the rotating body 10. The second drive unit 60 includes, for example, a guide rail extending in the radial direction C and a drive source. The guide rail is disposed to one side of the right end face 13 of the rotating body 10 and connected to an end portion of the flattening unit 50. The second drive unit 60 drives the flattening unit 50 to move along the radial direction C in such a way as to come closer to or separate from the inner circumferential surface 11 of the rotating body 10. The second drive unit 60 drives the flattening unit 50 to move in the radial direction C in units of one-layer thickness. The second drive unit 60 is constructed of, for example, a guide rail and a drive source. The second drive unit 60 causes the flattening unit 50 to flatten the slurry layer 200 with respect to the inner circumferential surface 11 of the rotating body 10 at a predetermined position. The first drive unit 40 and the second drive unit 60 may also drive the supply unit 30 and the flattening unit 50 as one common drive unit or may drive the supply unit 30 and the flattening unit 50 as two independent drive units respectively.

The irradiation unit 70 spot-radiates ultraviolet light at the irradiation position during rotation of the rotating body 10 by the rotation drive unit 20. The "irradiation position" refers to a position set in the slurry layer 200 and is a target position for irradiation with ultraviolet light. The "irradiation position" refers to a position defined based on the shape of the molded object and at which the slurry layer 200 is cured to form at least part of the molded object. The irradiation position is determined in such a way as to reproduce a cross-sectional shape based on, for example, CAD data of the molded object. The "spot-irradiation" here is an irradiation scheme under which ultraviolet light is condensed and an irradiation point (spot) is formed on slurry to obtain irradiation intensity necessary for ultraviolet light curable resin contained in the slurry to cure. The scale of the irradiation point by spot-irradiation is, for example, a circle having a diameter of 0.5 mm or more and 1 mm or less. The "irradiation unit 70 performing spot-irradiation with ultraviolet light during rotation of the rotating body 10" means that irradiation with ultraviolet light by the irradiation unit 70 is performed simultaneously or alternately with rotation of the rotating body 10 by the rotation drive unit 20.

The irradiation unit 70 is provided with, for example, an optical unit 71 and light reflecting members 72 and 74. The optical unit 71 is provided with, for example, a light source 71*a* and an optical member 71*b*, and emits ultraviolet light. The light reflecting members 72 and 74 are, for example, Galvano-mirrors and change an optical path of ultraviolet light emitted from the optical unit 71. The light reflecting members 72 and 74 are caused by rotation small drive units 73 and 75 to perform rotation operation around a predetermined axis of rotation. With rotations of the light reflecting members 72 and 74 being controlled, the irradiation unit 70 can irradiate slurry with ultraviolet light at the irradiation position and at a layer formation height position.

The irradiation unit 70 irradiates the inner circumferential surface 11 of the rotating body 10 with ultraviolet light at a position corresponding to the irradiation unit 70. For example, the irradiation unit 70 spot-radiates ultraviolet light in such a way as to scan over a line segment along the center line direction D from the left end face 12 to the right end face 13 of the rotating body 10. When the inner circumferential surface 11 of the rotating body 10 at the position corresponding to the irradiation unit 70 is assumed to be a "range U3," the irradiation unit 70 controls the light reflecting members 72 and 74, and rotation small drive units 73 and 75 to be able to irradiate, with ultraviolet light, slurry on the inner circumferential surface 11 of the rotating body 10 in the range U3.

Of the irradiation unit 70, at least the light reflecting member 74 and the rotation small drive unit 75 are provided closer to the axis of rotation M than the inner circumferential surface 11 of the rotating body 10 and located downstream of the flattening unit 50 in the rotating direction R of the rotating body 10. The ultraviolet light curable resin contained in slurry is cured by the irradiation unit 70 irradiating the slurry layer 200 flattened by the flattening unit 50 with ultraviolet light at the irradiation position. The irradiation unit 70 forms a cross section corresponding to one layer of the molded object by irradiating the slurry with ultraviolet light at the irradiation position of the layer 200 of slurry during rotation of the rotating body 10.

The controller 100 is hardware controlling the additive manufacturing apparatus 1. The controller 100 is constructed of a general-purpose computer including, for example, an operation apparatus such as a CPU (Central Processing Unit), a storage apparatus such as ROM (Read Only Memory), RAM (Random Access Memory), HDD (Hard Disk Drive) and a communication apparatus. The controller 100 is communicably connected to the rotation drive unit 20, the supply unit 30, the first drive unit 40, the second drive unit 60 and the irradiation unit 70.

Figure 2:
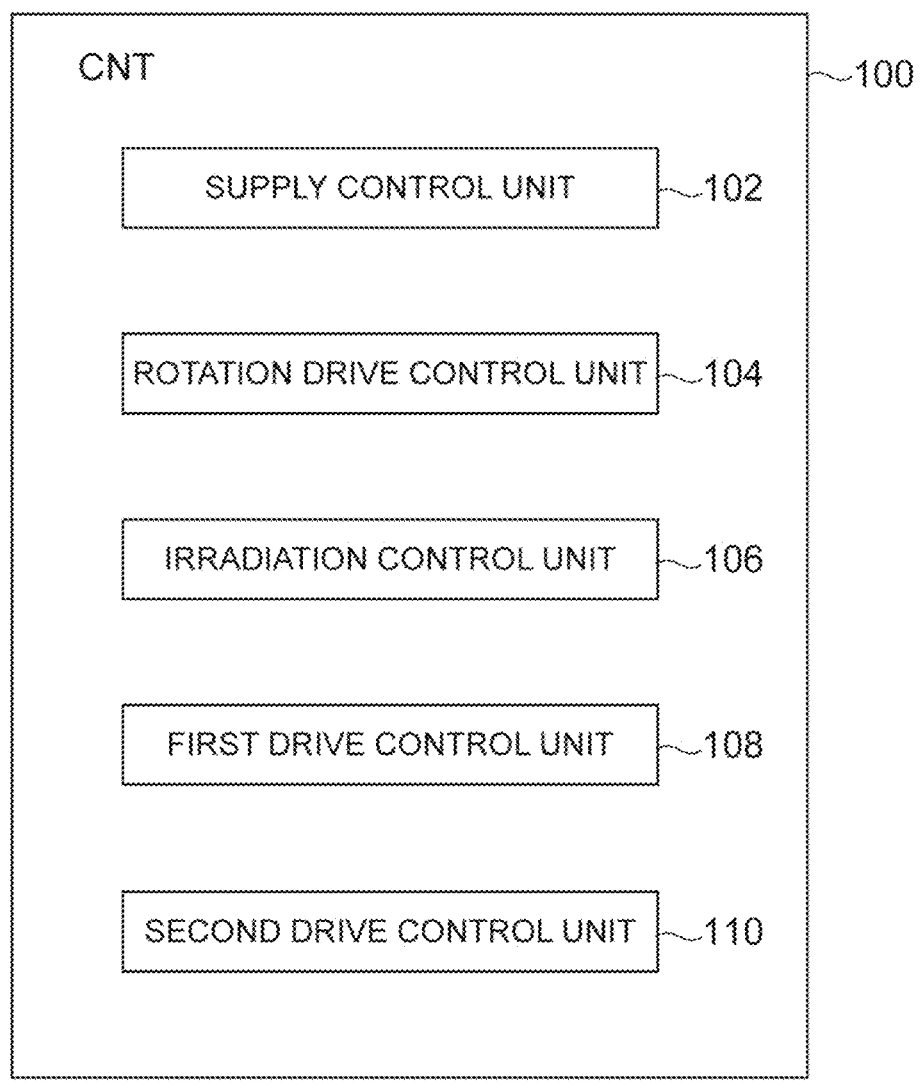
FIG. 2 is a block diagram illustrating an example of a controller of the additive manufacturing apparatus according to the first embodiment.

FIG. 2 is a block diagram illustrating an example of a control unit of the additive manufacturing apparatus according to the first embodiment. As shown in FIG. 2, the controller 100 includes a supply control unit 102, a rotation drive control unit 104, an irradiation control unit 106, a first drive control unit 108 and a second drive control unit 110. The supply control unit 102 controls the amount and the supply speed of slurry supplied to the inner circumferential surface 11 of the rotating body 10 by the supply unit 30 or the like.

The rotation drive control unit 104 controls the rotating direction R, the rotation speed, the number of revolutions, the angle of rotation, rotation start and rotation stop of the rotating body 10 in the rotation drive unit 20. The angle of rotation is an angle indicating the position of the rotating body 10 on the inner circumferential surface 11 at which a supply of slurry corresponding to one layer starts and is expressed using a reference position of rotation. The "reference position of rotation" is a predetermined fixed position which becomes an origin of the rotation angle, and can be, for example, a position corresponding to the irradiation unit 70, that is, the position of the range U3. The rotation drive unit 20 monitors a position of the rotating body 10 on the inner circumferential surface 11 at which a supply of slurry corresponding to one layer starts as a measurement position using the position of the range U3 as a reference. That is, the rotation drive unit 20 expresses the position of the rotating body 10 on the inner circumferential surface 11 at which a supply of slurry corresponding to one layer starts with an angle of rotation using the position of the range U3 as an origin position. When the reference position coincides with the measurement position, the rotation drive control unit 104 regards the angle of rotation as 0 degrees (origin) and increases the angle of rotation every time the measurement position moves in the rotating direction R. When the reference position coincides with the measurement position again, the rotation drive control unit 104 regards the angle of rotation as 0 degrees. The rotation drive control unit 104 determines whether or not the rotating body 10 has made one rotation based on the angle of rotation of the measurement position and measures the number of revolutions.

The irradiation control unit 106 controls the intensity of ultraviolet light or the position of the irradiation point of ultraviolet light radiated from the irradiation unit 70. The "position of the irradiation point" refers to a position at which the irradiation unit 70 radiates ultraviolet light. More specifically, the position of the irradiation point is a position at which the ultraviolet light radiated from the irradiation unit 70 reaches the slurry on the inner circumferential surface 11 of the rotating body 10.

The first drive control unit 108 controls the first drive unit 40. The first drive control unit 108 controls a relative distance between the supply unit 30 and the rotating body 10, and a speed and timing thereof of causing the rotating body 10 and the supply unit 30 to come closer to or separate from each other.

The second drive control unit 110 controls the second drive unit 60. The second drive control unit 110 controls a relative distance between the flattening unit 50 and the rotating body 10, and a speed and timing thereof of causing the rotating body 10 and the flattening unit 50 to come closer to or separate from each other.

The controller 100 causes the rotation drive unit 20, the supply unit 30, the first drive unit 40, the second drive unit 60 and the irradiation unit 70 to operate based on three-dimensional CAD data of the molded object stored in the storage apparatus. The controller 100 may control the flattening unit 50. The controller 100 may be provided outside the additive manufacturing apparatus 1.

Figure 3:
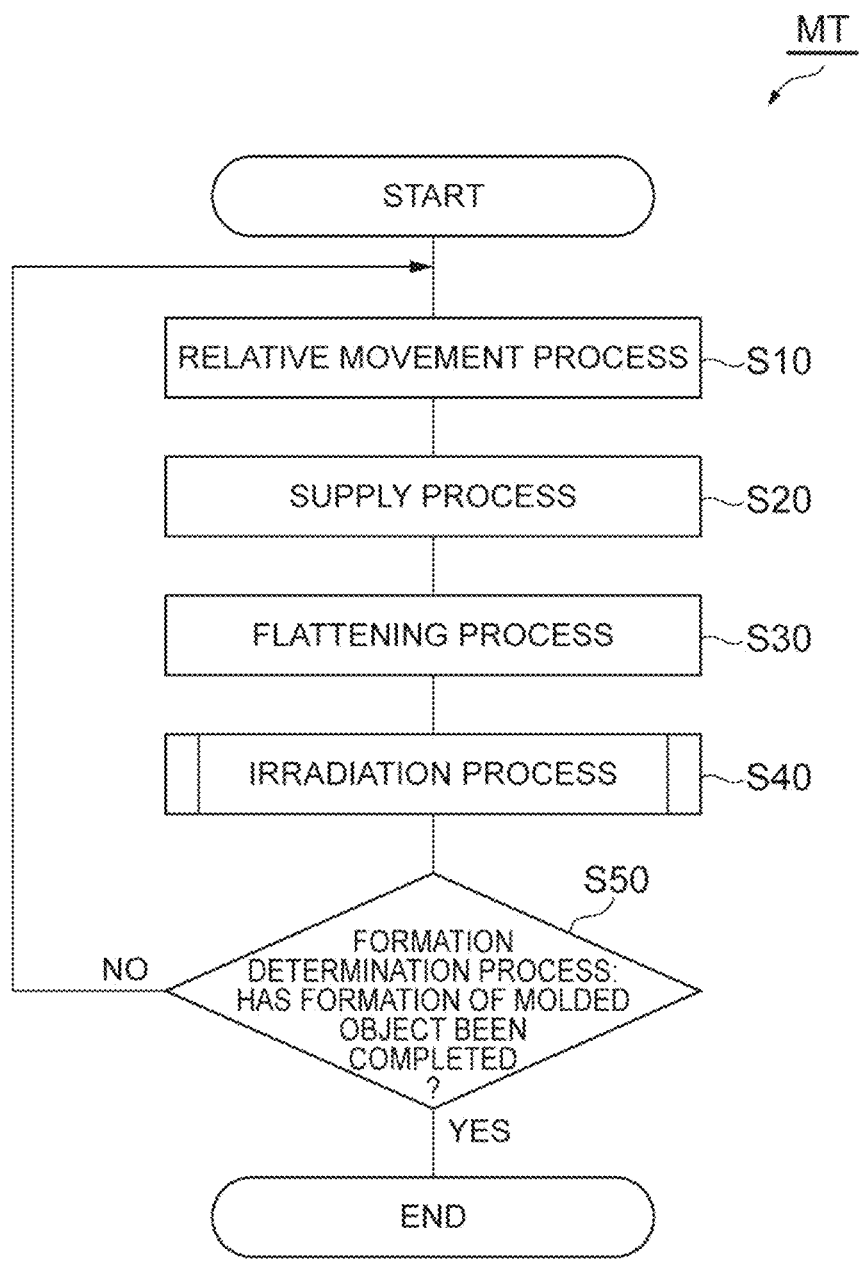
FIG. 3 is a flowchart illustrating an example of an additive manufacturing method according to the first embodiment.

Next, steps of manufacturing a molded object by the additive manufacturing apparatus 1 will be described. FIG. 3 is a flowchart illustrating an example of the additive manufacturing method according to the first embodiment. An additive manufacturing method MT shown in FIG. 3 is executed by the controller 100 during rotation of the rotating body 10 by the rotation drive unit 20.

First, in a relative movement process (S10), the first drive control unit 108 and the second drive control unit 110 of the controller 100 cause the first drive unit 40 and the second drive unit 60 to adjust the distances of the head 31 and the flattening unit 50 from the inner circumferential surface 11 of the rotating body 10 in such a way that the inner circumferential surface of the slurry supplied from the head 31 of the supply unit 30 becomes the layer formation height position. The first drive unit 40 causes the head 31 to move in the radial direction C based on the control of the first drive control unit 108 to adjust the distance from the inner circumferential surface 11 of the rotating body 10 in the radial direction C. The head 31 is adjusted in such a way as to be located at the layer formation height position.

Based on the control of the second drive control unit 110, the second drive unit 60 causes the flattening unit 50 to move in the radial direction C to adjust the distance from the inner circumferential surface 11 of the rotating body 10 in the radial direction C. The flattening unit 50 is adjusted so that the end portion thereof is located at the layer formation height position. In the relative movement process (S10), the rotation of the rotating body 10 by the rotation drive unit 20 may be stopped.

Next, the supply control unit 102 of the controller 100 causes the supply unit 30 to supply slurry to the inner circumferential surface 11 of the rotating body 10 as a supply process (S20). The supply control unit 102 causes the supply source 32 to supply slurry to the head 31 via the supply pipe 33. The head 31 supplies slurry on the inner circumferential surface 11 of the rotating body 10 (range U1) at the position corresponding to the head 31. Thus, the slurry is applied to the inner circumferential surface 11 of the rotating body 10 that has passed through the position corresponding to the head 31.

Next, the controller 100 causes the flattening unit 50 to flatten the slurry supplied to the inner circumferential surface 11 of the rotating body 10 to a thickness corresponding to one layer during rotation of the rotating body 10 by the rotation drive unit 20 as a flattening process (S30). The slurry supplied by the supply unit 30 moves to a position corresponding to the flattening unit 50 located downstream of the rotating body 10 in the rotating direction R. The flattening unit 50 flattens the slurry on the inner circumferential surface 11 of the rotating body 10 (range U2) at the position corresponding to the flattening unit 50. Thus, one layer of the slurry layer 200 is formed on the inner circumferential surface 11 of the rotating body 10 that has passed through the position corresponding to the flattening unit 50.

Next, the irradiation control unit 106 of the controller 100 causes the irradiation unit 70 to spot-irradiate the flattened slurry layer 200 with ultraviolet light at the irradiation position on the inner circumferential surface 11 of the rotating body 10 during rotation of the rotating body 10 by the rotation drive unit 20 as an irradiation process (S40). The slurry layer 200 flattened by the flattening unit 50 moves to a position corresponding to the irradiation unit 70 located downstream of the rotating body 10 in the rotating direction R. The irradiation unit 70 spot-irradiates, with ultraviolet light, the slurry layer 200 at the irradiation position on the inner circumferential surface 11 of the rotating body 10 (range U3) at the position corresponding to the light reflecting member 74. As the rotating body 10 rotates, the irradiation unit 70 spot-irradiates the slurry layer 200 with ultraviolet light at all the irradiation positions and forms a cross section corresponding to one layer of the molded object as a layer of the molded object on the inner circumferential surface 11 of the rotating body 10.

Next, the controller 100 determines whether or not formation of the molded object on the inner circumferential surface 11 of the rotating body 10 has been completed as a formation determination process (S50). Based on, for example, three-dimensional CAD data of the molded object stored in the storage apparatus, the number of revolutions of the rotating body 10, the height position of the head 31 of the supply unit 30 and the position of the irradiation point of the irradiation unit 70 or the like, when irradiations with ultraviolet light at all the irradiation positions have been completed, the controller 100 determines that the formation of the molded object has been completed. When the controller 100 determines that the formation of the molded object has been completed, the controller 100 ends the formation of the molded object by the additive manufacturing apparatus 1. When the controller 100 determines that the formation of the molded object has not been completed, the controller 100 proceeds to the relative movement process (S10). The controller 100 repeats the relative movement process (S10) and subsequent processes until the formation of the molded object is completed.

Figure 4A:
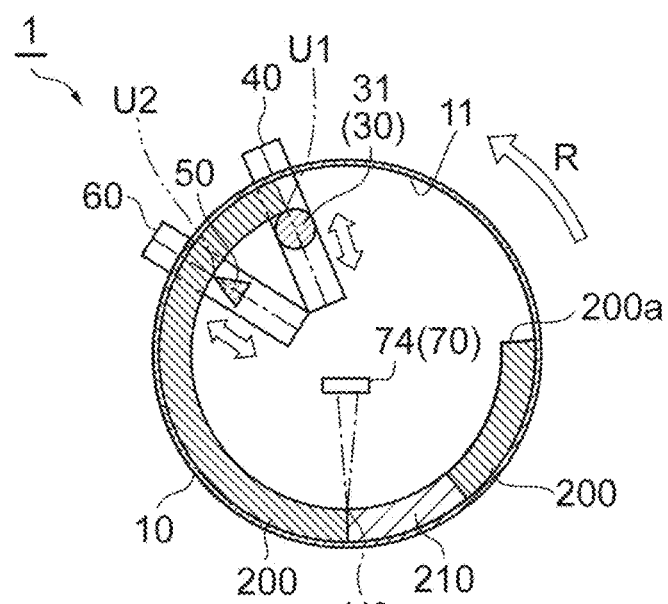
FIGS. 4A-4C are a view taken in the direction of arrows IV-IV in FIG. 1.
Figure 4B:
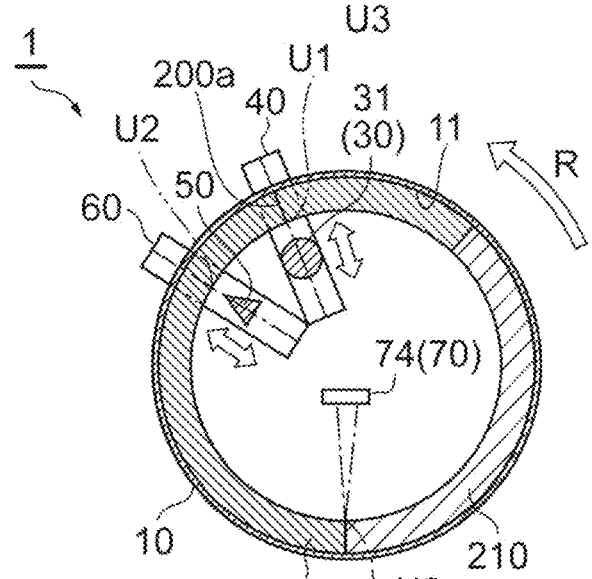
Figure 4C:
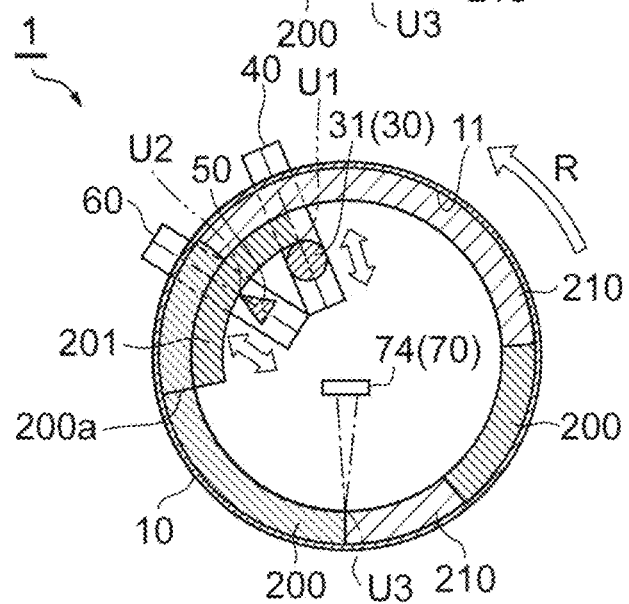

FIGS. 4A-4C are a view taken in the direction of arrows IV-IV in FIG. 1. FIG. 4A illustrates a state in which one layer of the slurry layer 200 is formed according the additive manufacturing method MT. As shown in FIG. 4A, the rotation drive unit 20 drives the inner circumferential surface 11 of the rotating body 10 to move in the rotating direction R and move to the range U1 which is the position corresponding to the head 31 of the supply unit 30. Thus, one layer of the slurry layer 200 is formed on the inner circumferential surface 11 by the head 31 of the supply unit 30. Since the rotation drive unit 20 drives the inner circumferential surface 11 of the rotating body 10 to move to the range U2 which is the position corresponding to the flattening unit 50, one layer of the slurry layer 200 is flattened by the flattening unit 50. Furthermore, when the rotation drive unit 20 drives the rotating body 10 to rotate, the slurry layer 200 on the inner circumferential surface 11 of the rotating body 10 is pressed outward in the radial direction C by a centrifugal force. This prevents the slurry from separating from the inner circumferential surface 11 during rotation of the rotating body 10.

A measurement position 200a is located downstream of the range U3 in the rotating direction R. When an irradiation position 210 is not set in the part which is about to pass through the irradiation unit 70, the slurry layer 200 passes through the range U3 without being irradiated with ultraviolet light by the irradiation unit 70. The irradiation unit 70 irradiates the slurry layer 200 in the range U3 with ultraviolet light at the irradiation position 210. Thus, one layer of the molded object is formed on one layer of the slurry layer 200.

FIG. 4B illustrates a state in which the entire one layer of the slurry layer 200 is formed according the additive manufacturing method MT. As shown in FIG. 4B, when the measurement position 200a reaches the range U1, the first drive unit 40 causes the head 31 of the supply unit 30 to separate from the slurry layer 200 by a thickness of one layer. The second drive unit 60 causes the flattening unit 50 to separate from the slurry layer 200 by a thickness of one layer. When the first drive unit 40 causes the supply unit 30 to move or the second drive unit 60 causes the flattening unit 50 to move, the rotation drive unit 20 may have stopped rotation of the rotating body 10.

FIG. 4C illustrates a state in which an upper layer 201 corresponding to one layer of slurry is formed on the inner circumferential surface of one layer of the slurry layer 200 is formed according the additive manufacturing method MT. As shown in FIG. 4C, the upper layer 201 of the slurry supplied from the head 31 of the supply unit 30 and flattened by the flattening unit 50 is laminated on the inner circumferential surface of the one layer of the slurry layer 200.

Figure 5:
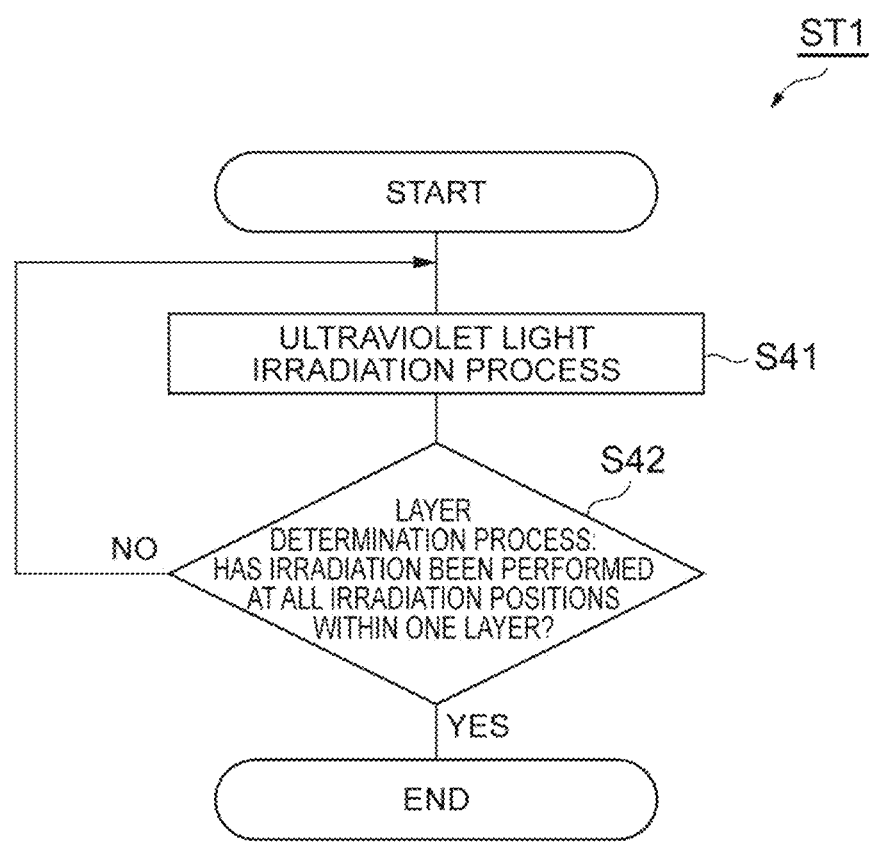
FIG. 5 is a flowchart illustrating an example of an irradiation process of the additive manufacturing method according to the first embodiment.

Next, a specific example of an irradiation process (S40) by the additive manufacturing apparatus 1 will be described. FIG. 5 is a flowchart illustrating an example of the irradiation process of the additive manufacturing method according to the first embodiment. An additive manufacturing method example ST1 shown in FIG. 5 is executed by the controller 100 when the irradiation position 210 in the slurry layer 200 flattened in the flattening process (S30) shown in FIG. 3 during rotation of the rotating body 10 by the rotation drive unit 20 rotates and moves to the range U3. In the additive manufacturing method example ST1, the irradiation unit 70 spot-irradiates the one layer of the slurry layer 200 with ultraviolet light at all the irradiation positions 210 during one rotation of the rotating body 10. Note that in the additive manufacturing method example ST1, the supply process (S20) by the supply unit 30 and the flattening process (S30) by the flattening unit 50 shown in FIG. 3 may be executed simultaneously.

First, in an ultraviolet light irradiation process (S41), the irradiation control unit 106 of the controller 100 causes the irradiation unit 70 to spot-irradiate the slurry layer 200 flattened on the inner circumferential surface 11 of the rotating body 10 with ultraviolet light at the irradiation position 210. Through adjustments by the light reflecting members 72 and 74, and the rotation small drive units 73 and 75, the irradiation unit 70 spot-irradiates the inner circumferential surface 11 of the rotating body 10 (range U3) at all the irradiation positions 210 at the position corresponding to the light reflecting member 74.

Next, the controller 100 determines whether or not the irradiation unit 70 has irradiated the one layer of the slurry layer 200 with ultraviolet light at all the irradiation positions 210 as a layer determination process (S42). More specifically, the controller 100 determines whether or not the slurry layer 200 has been irradiated with ultraviolet light at all the irradiation positions 210 based on the irradiation position 210 and the angle of rotation on the slurry layer 200. Alternatively, the controller 100 may determine whether or not the angle of rotation measured by the rotation drive control unit 104 has become 0 degrees. When the controller 100 determines that the irradiation unit 70 has irradiated the one layer of the slurry layer 200 with ultraviolet light at all the irradiation positions 210, since the one layer of the slurry layer 200 has been spot-irradiated with ultraviolet light at all the irradiation positions 210 during one rotation of the rotating body 10, the irradiation process (S40) by the additive manufacturing apparatus 1 is ended.

When the controller 100 determines that the irradiation unit 70 has not irradiated the one layer of the slurry layer 200 with ultraviolet light at all the irradiation positions 210, the controller 100 causes the rotation drive control unit 104 to rotate the rotating body 10 until the irradiation position 210 upstream in the rotating direction R moves into the range U3, and then the controller 100 proceeds to the ultraviolet light irradiation process (S41). The controller 100 repeats the ultraviolet light irradiation process (S41) and subsequent processes until it is determined that the irradiation unit 70 has irradiated the one layer of the slurry layer 200 with ultraviolet light at all the irradiation positions 210.

When the measurement position 200a passes through the range U1 while the additive manufacturing method example ST1 is being executed, the supply control unit 102 of the controller 100 causes the supply unit 30 to supply slurry to the slurry layer 200 as the supply process in FIG. 3 (S20). When the measurement position 200a passes through the range U2 while the additive manufacturing method example ST1 is being executed, the controller 100 causes the flattening unit 50 to flatten the slurry supplied to the slurry layer 200 as the flattening process (S30).

Figure 6A:
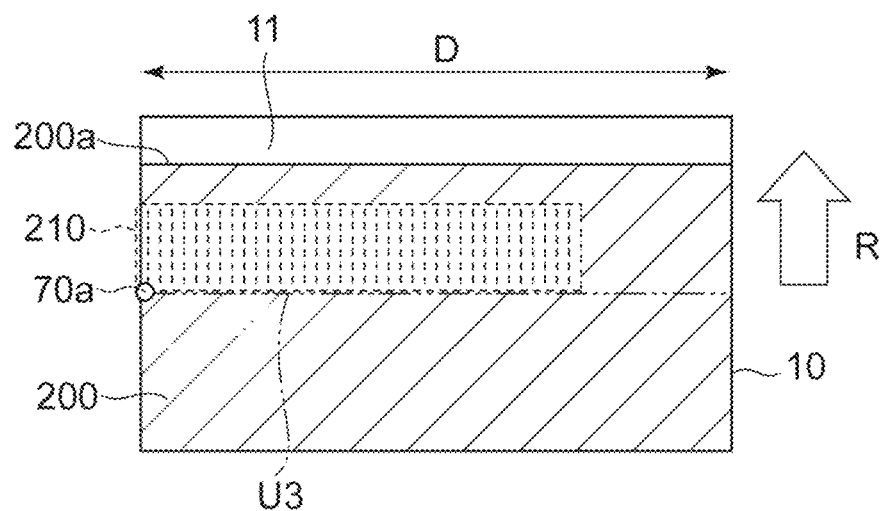
FIGS. 6A-6B are a view taken in the direction of arrows VI-VI in FIG. 1.
Figure 6B:
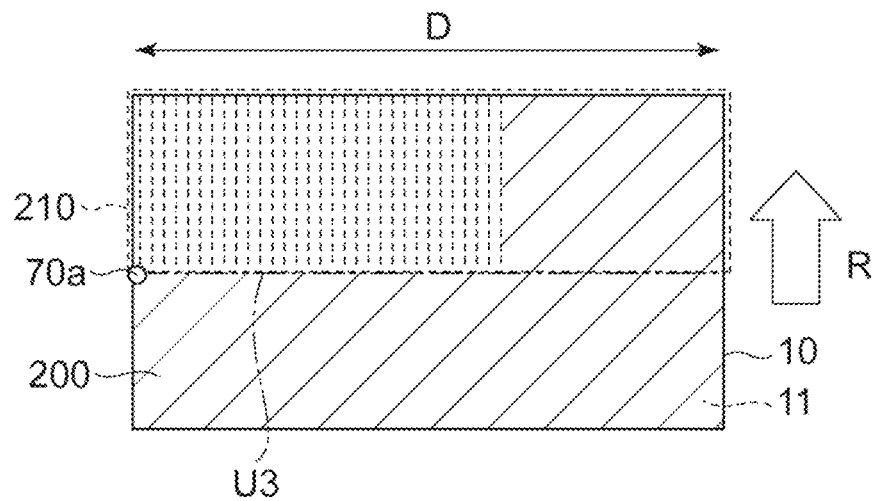

FIGS. 6A-6B are a view taken in the direction of arrows VI-VI in FIG. 1 and is a plan view of the rotating body when the irradiation process in FIG. 5 is executed. FIG. 6A illustrates a state in which the irradiation unit 70 has completed ultraviolet light irradiation process (S41) a plurality of times on the one layer of the slurry layer 200. As shown in FIG. 6A, in the slurry layer 200 supplied by the head 31 of the supply unit 30 and flattened by the flattening unit 50, a measurement position 200a is located downstream of the range U3 in the rotating direction R. When the irradiation position 210 is not set in the part which is about to pass through the irradiation unit 70, the slurry layer 200 passes through the range U3 without being irradiated with ultraviolet light by the irradiation unit 70. The irradiation unit 70 in the additive manufacturing method example ST1 irradiates the slurry layer 200 in the range U3 with ultraviolet light at all the irradiation positions 210 during one rotation of the rotating body 10 by the rotation drive unit 20. Ultraviolet light radiated from the irradiation unit 70 is represented by a dot such as an irradiation point 70a on slurry on the inner circumferential surface 11 of the rotating body 10. By moving the position of the irradiation point 70a in the center line direction D in the range U3, the irradiation unit 70 can radiate ultraviolet light at all the irradiation positions 210 in the range U3. In this way, one layer of the molded object is formed in the center line direction D of the one layer of the slurry layer 200.

FIG. 6B illustrates a state in which the irradiation unit 70 has completed all the ultraviolet light irradiation processes (S41) on the one layer of the slurry layer 200. As shown in FIG. 6B, in the additive manufacturing method example ST1, the irradiation position 210 at which ultraviolet light is radiated at the position of the irradiation point 70a rotates even after the ultraviolet light irradiation process (S41), and so it is located downstream of the range U3 in the rotating direction R.

In the additive manufacturing method example ST1, a layer of the molded object corresponding to one layer is formed during one rotation, and so the supply unit 30 can supply an upper layer 201 of slurry to the layer of the molded object through the relative movement process (S10) and the supply process (S20). For this reason, after the measurement position 200a passes through the range U1 which is the position corresponding to the head 31, slurry is supplied from the head 31 to the inner circumferential surface of the slurry layer 200. In this way, the upper layer 201 of slurry is supplied to the inner circumferential surface of the slurry layer 200 from the range U1 to the measurement position 200a downstream in the rotating direction R. In this way, the additive manufacturing method example ST1 can continuously form the slurry layer 200 and can improve the manufacturing speed of the molded object. All the one layer of the molded object is formed by the time the measurement position 200a reaches the range U3 (reference position) again. Along with the ultraviolet light irradiation process (S41) when the measurement position 200a reaches the range U3 (reference position) and subsequent processes, a layer of the molded object is also formed at the irradiation position 210 of the upper layer 201 of slurry.

Figure 7:
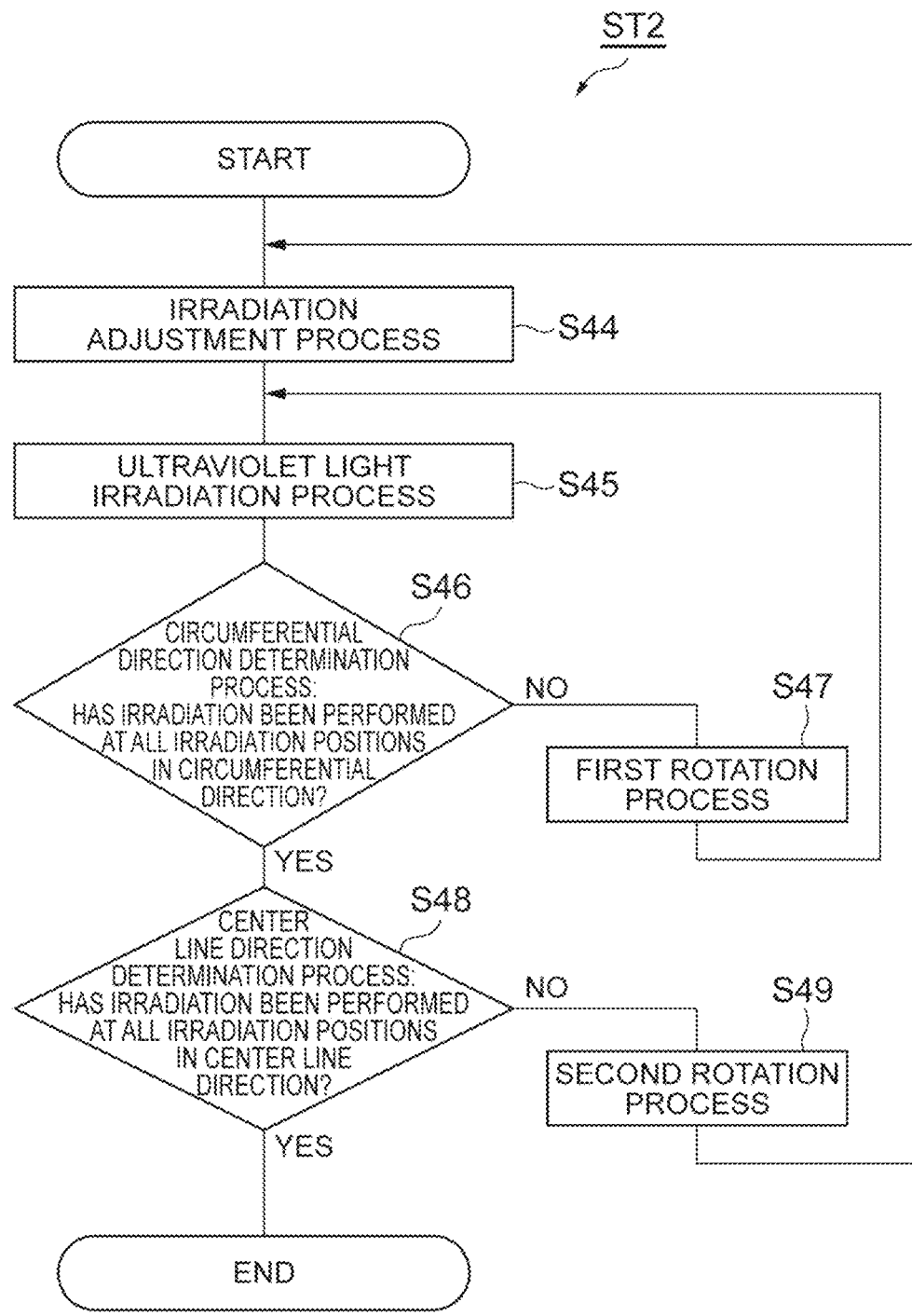
FIG. 7 is a flowchart illustrating an example of an irradiation process of the additive manufacturing method according to the first embodiment.

Next, another specific example of the irradiation process (S40) by the additive manufacturing apparatus 1 will be described. FIG. 7 is a flowchart illustrating an example of the irradiation process of the additive manufacturing method according to the first embodiment. An additive manufacturing method example ST2 shown in FIG. 7 is executed by the controller 100 when the irradiation position 210 of the slurry layer 200 flattened in the flattening process (S30) shown in FIG. 3 rotates and moves to the range U3. After the irradiation position 210 rotates and moves to the range U3, the controller 100 stops the rotation of the rotating body 10 by the rotation drive unit 20, and then proceeds to each process in the additive manufacturing method example ST2.

In the additive manufacturing method example ST2, the irradiation unit 70 changes the position of the ultraviolet light irradiation point 70a for every rotation of the rotating body 10 along the center line direction D of the inner circumferential surface 11 of the rotating body 10. The irradiation unit 70 performs control in such a way as to prevent the position of the irradiation point 70a from moving in the center line direction D during one rotation of the rotating body 10. This allows the irradiation unit 70 to scan the irradiation point in such a way as to describe a circle around the central axis of the rotating body 10 on the inner circumferential surface 11 of the rotating body 10 as the rotating body 10 rotates. Thus, the irradiation unit 70 can realize line irradiation in the rotating direction R of the rotating body 10 using spot-irradiation and rotation of the rotating body 10. When a plurality of irradiation positions 210 are set along the center line direction D at positions of the range U3 of the one layer of the slurry layer 200, every time the rotation drive unit 20 causes the rotating body 10 to make one rotation, the irradiation unit 70 moves the position of the irradiation point 70a in the center line direction D and spot-irradiates the one layer of the slurry layer 200 with ultraviolet light at the irradiation position 210. Note that the additive manufacturing method example ST2 is different from the additive manufacturing method example ST1 in that the supply process (S20) by the supply unit 30 shown in FIG. 3 and the flattening process (S30) by the flattening unit 50 are not executed simultaneously.

First, in an irradiation adjustment process (S44), the irradiation control unit 106 of the controller 100 causes the irradiation unit 70 to recognize the irradiation position 210 in the one layer of the slurry layer 200 based on three-dimensional CAD data of the molded object stored in the storage apparatus. The irradiation unit 70 fixes the position of the irradiation point 70a in the center line direction D based on the irradiation position 210 on the one layer of the slurry layer 200.

Next, the irradiation control unit 106 of the controller 100 causes the irradiation unit 70 to spot-irradiate slurry flattened on the inner circumferential surface 11 of the rotating body 10 with ultraviolet light at the irradiation position 210 as a ultraviolet light irradiation process (S45). The irradiation unit 70 performs spot-irradiation at the irradiation position 210 coinciding with the fixed position of the irradiation point 70a within the range U3. That is, in the additive manufacturing method example ST2, even when there are other irradiation positions 210 at positions other than the irradiation point 70a in the center line direction D of the range U3, the irradiation unit 70 does not perform spot-irradiation with ultraviolet light at the irradiation position 210.

Next, the controller 100 determines whether or not the irradiation unit 70 has irradiated the one layer of the slurry layer 200 with ultraviolet light at all the irradiation positions 210 in the rotating direction R at the fixed position of the irradiation point 70a of the irradiation position 210 as a circumferential direction determination process (S46). In the ultraviolet light irradiation process (S45), the controller 100 determines whether or not there is any irradiation position 210 at which the one layer of the slurry layer 200 in the upstream direction of the rotating direction R from the irradiation position 210 at which ultraviolet light is radiated from the irradiation unit 70, not irradiated with ultraviolet light by the irradiation unit 70.

In the circumferential direction determination process (S46), when it is determined that the irradiation unit 70 has not irradiated the one layer of the slurry layer 200 with ultraviolet light at all the irradiation positions 210 in the rotating direction R at the fixed position of the irradiation point 70*a* of the irradiation position 210, the controller 100 proceeds to a first rotation process (S47). The controller 100 causes the rotation drive unit 20 to rotate the rotating body 10 as the first rotation process (S47). The rotation drive control unit 104 causes the rotating body 10 to rotate until the irradiation position 210 downstream in the rotating direction R moves to the irradiation point 70*a* in the range U3. When the first rotation process (S47) ends, the controller 100 proceeds to the ultraviolet light irradiation process (S45). The controller 100 repeats the ultraviolet light irradiation process (S45) and subsequent processes until the irradiation unit 70 irradiates the one layer of the slurry layer 200 with ultraviolet light at all the irradiation positions 210 in the rotating direction R at the fixed position of the irradiation point 70*a* of the irradiation position 210.

In the circumferential direction determination process (S46), when it is determined that the irradiation unit 70 has radiated ultraviolet light at all the irradiation positions 210 in the rotating direction R, the controller 100 proceeds to a center line direction determination process (S48). As the center line direction determination process (S48), the controller 100 determines whether or not the irradiation unit 70 has irradiated the one layer of the slurry layer 200 in the center line direction D with ultraviolet light at all the irradiation positions 210. The controller 100 determines, in the ultraviolet light irradiation process (S45), whether or not the irradiation unit 70 has irradiated the one layer of the slurry layer 200 with ultraviolet light at all the irradiation positions 210 based on, for example, three-dimensional CAD data of the molded object stored in the storage apparatus.

When it is determined, in the center line direction determination process (S48), that the irradiation unit 70 has not irradiated the one layer of the slurry layer 200 with ultraviolet light at all the irradiation positions 210, the controller 100 proceeds to a second rotation process (S49). As the second rotation process (S49), the controller 100 causes the rotation drive unit 20 to rotate the rotating body 10. The rotation drive control unit 104 rotates the rotating body 10 until the irradiation position 210 located upstream in the rotating direction R moves into the range U3. When the second rotation process (S49) ends, the controller 100 proceeds to the irradiation adjustment process (S44). The controller 100 moves the position of the irradiation point in the center line direction D and fixes the position. The controller 100 repeats the irradiation adjustment process (S44) and subsequent processes until the irradiation unit 70 irradiates the slurry layer 200 with ultraviolet light at all the irradiation positions 210.

When it is determined, in the center line direction determination process (S48), that the irradiation unit 70 has irradiated the one layer of the slurry layer 200 with ultraviolet light at all the irradiation positions 210, the controller 100 ends the irradiation process (S40).

Figure 8A:
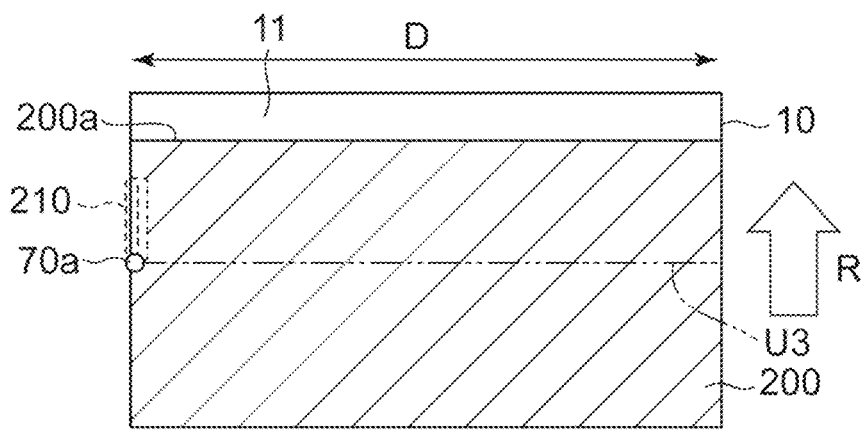
FIGS. 8A-8D are a view taken in the direction of arrows VIII-VIII in FIG. 1.

FIGS. 8A-8D are a view taken in the direction of arrows VIII-VIII in FIG. 1 and is a plan view of the rotating body when the irradiation process in FIG. 7 is executed. FIG. 8A illustrates a state in which the irradiation unit 70 has executed the circumferential direction determination process (S46) a plurality of times on the one layer of the slurry layer 200 and has executed the ultraviolet light irradiation process (S45) a plurality of times via the first rotation process (S47). As shown in FIG. 8A, ultraviolet light radiated from the irradiation unit 70 is represented by a dot such as the irradiation point 70*a* on the inner circumferential surface 11 of the rotating body 10. Through the irradiation adjustment process (S44) executed by the controller 100, the position of the irradiation point 70*a* moves in the center line direction D. The slurry layer 200 supplied by the head 31 of the supply unit 30, flattened by the flattening unit 50 and reaching the range U3 is spot-irradiated with ultraviolet light at the irradiation position 210 that is aligned with the fixed position of the irradiation point 70*a* among the irradiation positions 210 of the one layer of the slurry layer 200. The irradiation unit 70 in the additive manufacturing method example ST2 irradiates the slurry layer 200 within the range U3 with ultraviolet light at the irradiation position 210 that is aligned with the fixed position of the irradiation point 70*a* in the center line direction D.

Figure 8B:
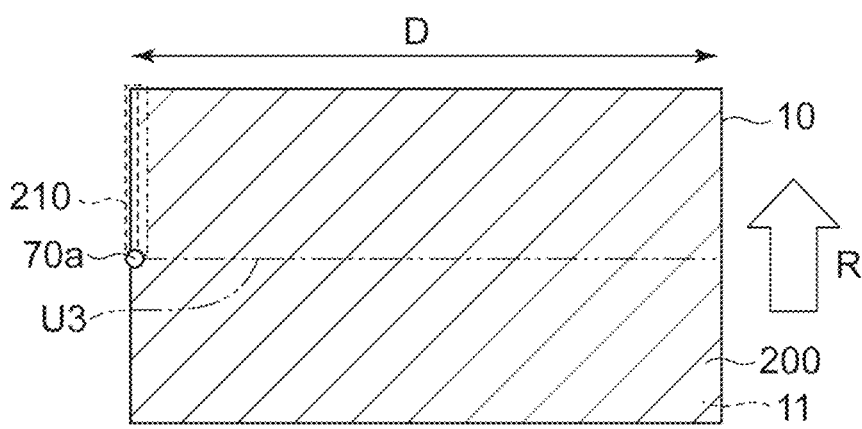

FIG. 8B illustrates a state in which on one layer of the slurry layer 200, the irradiation unit 70 further executes a circumferential direction determination process (S46) a plurality of times after FIG. 8A and a ultraviolet light irradiation process (S45) is executed a plurality of times via a first rotation processing (S47). As shown in FIG. 8B, in the additive manufacturing method example ST2, since the irradiation position 210 at which ultraviolet light is radiated at the position of the irradiation point 70*a* rotates through the first rotation process (S47) executed after the ultraviolet light irradiation process (S41), it is located downstream of the range U3 in the rotating direction R. In the additive manufacturing method example ST2, the irradiation control unit 106 fixes the position of the irradiation point 70*a* in the center line direction D during one rotation of the rotating body 10 by the rotation drive unit 20. For this reason, by repeating these processes, the irradiation unit 70 is in a state in which it has radiated ultraviolet light at all the irradiation positions 210 in the rotating direction R at the position in the center line direction D. Thus, since the irradiation unit 70 need not change the position of the irradiation point 70*a* in the center line direction D in accordance with the angle at which the rotation drive unit 20 rotates the rotating body 10, the additive manufacturing method example ST2 can improve the manufacturing speed of the molded object.

By the time the irradiation unit 70 radiates ultraviolet light at all the irradiation positions 210, the first drive control unit 108 causes the first drive unit 40 to adjust a relative distance between the inner circumferential surface 11 of the rotating body 10 and the supply unit 30. By the time the irradiation unit 70 radiates ultraviolet light at all the irradiation positions 210, the second drive control unit 110 causes the second drive unit 60 to adjust a relative distance between the inner circumferential surface 11 of the rotating body 10 and the flattening unit 50. In this way, layers of molded objects on upper layers of the slurry layer 200 can also be formed continuously after forming layers of the molded objects on the slurry layer 200, and so the additive manufacturing method example ST2 can improve the manufacturing speed of the molded object.

Figure 8C:
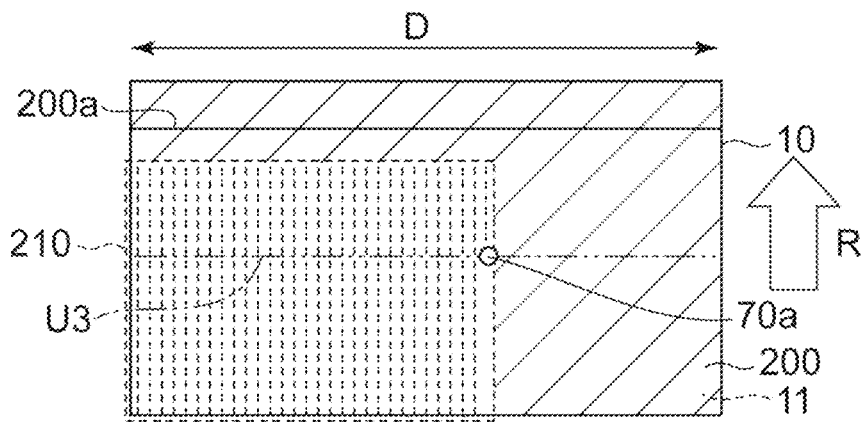

FIG. 8C illustrates a state in which after FIG. 8B, the irradiation unit 70 further performs the center line direction determination process (S48) a plurality of times, the circumferential direction determination process (S46) a plurality of times and the ultraviolet light irradiation process (S45) a plurality of times on one layer of the slurry layer 200. In the additive manufacturing method example ST2 as shown in FIG. 8C, the position of the irradiation point 70*a* is moved along the center line direction D and fixed in the irradiation adjustment process (S44) after the center line direction determination process (S48). It is thereby possible to align the fixed position of the irradiation point 70*a* with the irradiation position 210 in the center line direction D.

Figure 8D:
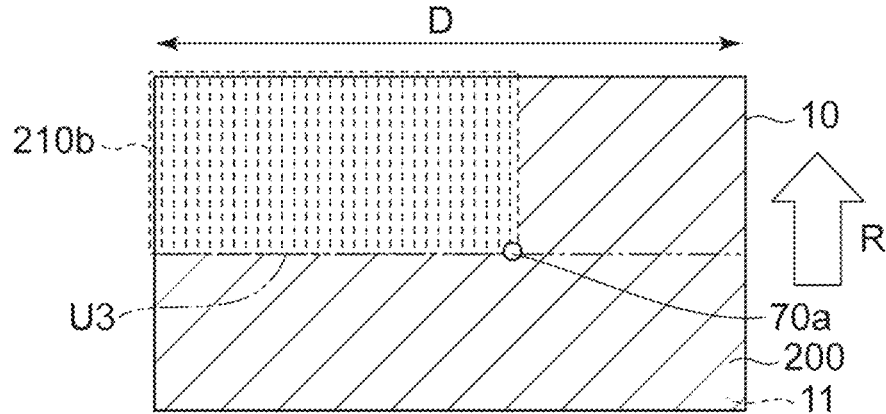

FIG. 8D illustrates a state in which the irradiation unit 70 has completed all the ultraviolet light irradiation processes (S45) on the one layer of the slurry layer 200. As shown in FIG. 8D, the supply unit 30 does not supply the upper layer of slurry to the inner circumferential surface of the slurry layer 200 until the slurry layer 200 is irradiated with ultraviolet light at all the irradiation positions 210. When the slurry layer 200 is irradiated with ultraviolet light at all the irradiation positions 210, the supply unit 30 may start forming the upper layer 201 of slurry even when the measurement position 200a of the slurry layer 200 has not reached the range U1 outward in the radial direction C of the head 31.

As described so far, according to the additive manufacturing apparatus 1 and the additive manufacturing method MT of the present embodiment, it is possible to improve a speed of manufacturing the molded object. Furthermore, when the rotating body 10 rotates, slurry is pressed outward in the radial direction C by a centrifugal force on the inner circumferential surface 11 of the rotating body 10. For this reason, the additive manufacturing apparatus 1 and the additive manufacturing method MT can prevent slurry from being separated from the inner circumferential surface 11 during rotation of the rotating body 10.

Furthermore, since the rotation drive unit 20 causes the inner circumferential surface 11 of the rotating body 10 to move in the rotating direction R with respect to the supply unit 30, the flattening unit 50 and the irradiation unit 70, the supply unit 30, the flattening unit 50 and the irradiation unit 70 need not move in the rotating direction R. For this reason, the supply unit 30, the flattening unit 50 and the irradiation unit 70 can execute processes without waiting for the movement of each component to be completed, and can thereby form layers of the molded object continuously.

The supply unit 30 and the flattening unit 50 can be moved with respect to the rotating body 10 by the first drive unit 40 and the second drive unit 60 without waiting for a process of each component to be completed. This allows the additive manufacturing apparatus 1 and the additive manufacturing method MT to shorten the time to wait for each component to complete the movement or processing.

According to the additive manufacturing method example ST1, formation of one layer of the molded object is completed while the rotation drive unit 20 causes the rotating body 10 to make one rotation from the irradiation position 210 of irradiation with ultraviolet light by the irradiation unit 70. Thus, the additive manufacturing method example ST1 can execute the respective processes by the supply unit 30, the flattening unit 50 and the irradiation unit 70 continuously.

According to the additive manufacturing method example ST2, the irradiation unit 70 need not change the position of the irradiation point 70a of the rotating body 10 in the center line direction D of the inner circumferential surface 11 while the rotating body 10 makes one rotation after starting irradiation with ultraviolet light. Thus, in the additive manufacturing method example ST2, it is possible to reduce time required to change the position of the irradiation point 70a by the irradiation unit 70. While the irradiation unit 70 radiates ultraviolet light by changing the position of the irradiation point 70a in the center line direction D for every rotation of the rotating body 10, the first drive unit 40 can adjust the relative distance between the inner circumferential surface 11 of the rotating body 10 and the supply unit 30. While the irradiation unit 70 radiates ultraviolet light by changing the position of the irradiation point 70a in the center line direction D for every rotation of the rotating body 10, the second drive unit 60 can adjust the relative distance between the inner circumferential surface 11 of the rotating body 10 and the flattening unit 50. When the slurry layer 200 is irradiated with ultraviolet light at all the irradiation positions 210, the supply unit 30 can start forming the upper layer of slurry even when the measurement position 200a of the slurry layer 200 has not reached the range U1 which is the position corresponding to the head 31.

Second Embodiment

Next, an additive manufacturing apparatus according to a second embodiment will be described. In the present embodiment, differences from the first embodiment will be described and duplicate description will be omitted. The additive manufacturing apparatus according to the second embodiment is different from the additive manufacturing apparatus 1 according to the first embodiment in that it is provided with a nozzle, and the rest of the configuration is the same.

Figure 9:
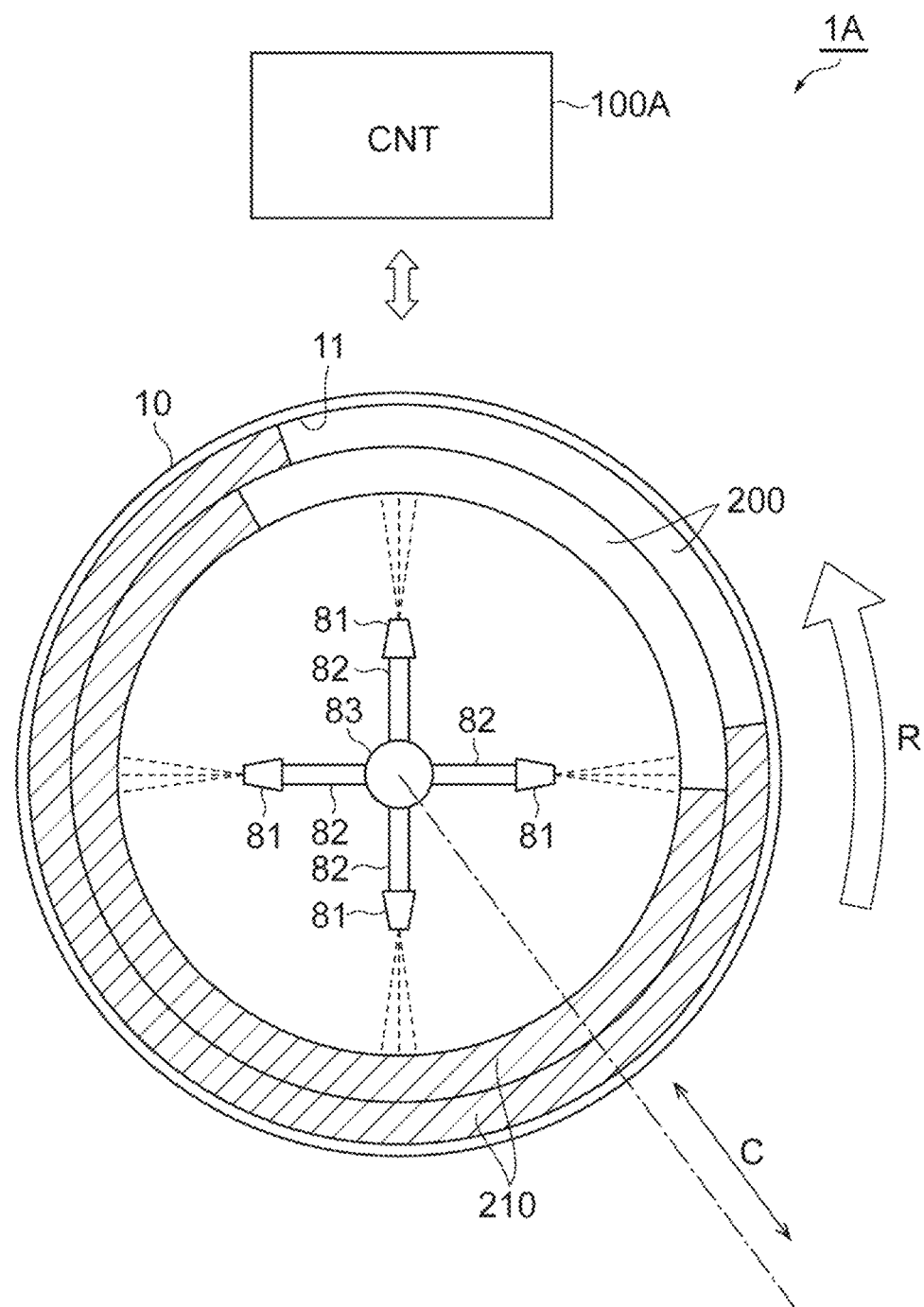
FIG. 9 is a schematic diagram illustrating an example of the additive manufacturing apparatus according to the second embodiment.

FIG. 9 is a schematic view illustrating an example of the additive manufacturing apparatus according to the second embodiment. In FIG. 9, descriptions of the supply unit 30, the flattening unit 50 and the irradiation unit 70 are omitted. As shown in FIG. 9, the additive manufacturing apparatus 1A is provided with the rotating body 10, the rotation drive unit 20, a nozzle 81 and the controller 100A. The nozzle 81 supplies a liquid or gas to the inner circumferential surface 11 of the rotating body 10. The liquid or gas supplied from the nozzle 81 is, for example, a cleaning liquid. Specific examples of the cleaning liquid include an organic solvent such as ethanol, methanol, acetone, isobutyl alcohol, toluene or xylene, or acrylic monomer or epoxy monomer containing polymerization inhibitor. The nozzle 81 supplies a cleaning liquid to the slurry layer 200 or a molded object formed on the inner circumferential surface 11 of the rotating body 10 for cleaning by the additive manufacturing apparatus 1 according to the first embodiment.

The nozzle 81 is connected, for example, to a cleaning pipe 82 and a cleaning pump 83. The cleaning liquid is supplied to the nozzle 81 by the cleaning pump 83 via the cleaning pipe 82. The nozzle 81 is disposed closer to the axis of rotation M than the inner circumferential surface 11 of the rotating body 10 and extends along the axis of rotation M. Since the inner circumferential surface 11 of the rotating body 10 passes through the position corresponding to the nozzle 81 as the rotating body 10 rotates, the nozzle 81 can thereby supply the cleaning liquid at an arbitrary position of the inner circumferential surface 11 of the rotating body 10. The amount of the cleaning liquid supplied from the nozzle 81 is determined based on a length from the left end face 12 to the right end face 13 in the center line direction D, a rotation speed of the rotating body 10 or a shape of the molded objector or the like. Two or more nozzles 81, cleaning pipes 82 or cleaning pumps 83 may be provided. Furthermore, after forming the molded object, the supply unit 30, the flattening unit 50 and the irradiation unit 70 may be extracted from within the rotating body 10 and the nozzle 81 may then be disposed in the rotating body 10.

The controller 100A is communicably connected to the rotation drive unit 20A and the nozzle 81. The controller 100A can have the same hardware configuration as that of the controller 100. The controller 100A includes a rotation drive control unit 104A and a cleaning control unit 112. The rotation drive control unit 104A controls the rotating direction R, the rotation speed, the number of revolutions, start of rotation, time of rotation and stop of rotation of the rotating body 10 by the rotation drive unit 20. The cleaning control unit 112 controls the amount of supply, the supply speed, the supply time, and the spray range or the like of the cleaning liquid by the nozzle 81.

Hereinafter, a step of cleaning a molded object by the additive manufacturing apparatus 1A will be described. The rotation drive control unit 104A of the controller 100 causes the rotation drive unit 20 to drive the rotating body 10 to rotate in the rotating direction R. Next, the cleaning control unit 112 of the controller 100 causes the nozzle 81 to supply the cleaning liquid to the slurry layer 200 and the molded object on the inner circumferential surface 11 of the rotating body 10. Since uncured slurry has higher fluidity than the molded object, the uncured slurry is separated from the molded object by the supplied cleaning liquid. Furthermore, when the rotating body rotates, a centrifugal force is applied to the uncured slurry, the fluidity thereof further increases and the uncured slurry is more easily separated from the molded object. Furthermore, even when the molded object has a complicated shape, when the rotating body 10 rotates, the centrifugal force makes it easier for the supplied cleaning liquid to penetrate into small parts, thus reducing man-hours in a step of cleaning the molded object. In this way, the additive manufacturing apparatus 1A can easily separate the uncured slurry from the surface of the molded object and extract the molded object.

[Modifications]

Various exemplary embodiments have been described so far, but various omissions, substitutions and changes can be made without being limited to the aforementioned exemplary embodiments. For example, the slurry according to the first embodiment and the second embodiment may include photosetting resin. In this case, the irradiation unit 70 radiates light.

The supply units 30, the flattening units 50, the first drive unit 40, the second drive units 60, and the irradiation unit 70 according to the first embodiment may be provided in plurality. In this case, an irradiation set composed of the supply unit 30, the flattening unit 50, the first drive unit 40, the second drive unit 60, and the irradiation unit 70 as one set is provided along the rotating direction R of the rotating body 10. In the first embodiment, the supply unit 30, the flattening unit 50 and the irradiation unit 70 may be disposed in such a way that the higher the fluidity of slurry, the shorter the distance from the supply unit 30 to the irradiation unit 70 becomes. In the first embodiment, the supply unit 30, the flattening unit 50 and the irradiation unit 70 may be provided below the axis of rotation M. In this case, the additive manufacturing apparatus 1 can prevent at least the part of the supplied slurry that becomes the molded object from being separated from the inner circumferential surface 11 due to gravity.

The rotating body 10 according to the first embodiment or the second embodiment need not be cylindrical. In this case, the rotating body 10 may be quadrangular prism or the like. Regardless of the outer shape, the rotating body 10 only needs to have a space 15 defined by the inner circumferential surface 11 inside the rotating body 10. A stage including a top surface to which slurry is supplied may be provided on the inner circumferential surface 11 of the rotating body 10 according to the first embodiment or the second embodiment. The additive manufacturing apparatus 1 may be provided with a plurality of stages. In this case, the additive manufacturing apparatus 1 can form a molded object on each stage. The top surface of the stage may be flat. In this case, the distances in the radial direction C between the top surface of the stage and the supply unit 30, the flattening unit 50 and the irradiation unit 70 are different distances. For this reason, the supply unit 30 may change the supply speed and the supply amount of slurry depending on the distances. The flattening unit 50 may change the length in the radial direction C of the end portion in contact with the flat surface of the stage depending on the rotation speed and the angle of rotation of the rotating body 10. The irradiation unit 70 may change the layer formation height position depending on the rotation speed and the angle of rotation of the rotating body 10.

The head 31 of the supply unit 30 of the first embodiment may be separated from the inner circumferential surface 11 of the rotating body 10 in such a way as to have a height obtained by adding the thickness of the slurry layer 200 to the layer formation height position.

Furthermore, in the additive manufacturing apparatus 1 according to the first embodiment, when supply and flattening for a first layer of slurry and supply and flattening for a second layer of slurry are performed sequentially in time, the supply unit 30 and the flattening unit 50 need to be moved in the direction away from the rotating body 10 by one layer at the timing of starting the supply and the flattening for the second layer of slurry. However, the movement of the supply unit 30 and the flattening unit 50 takes time no matter how short it may be, and so there is a possibility that the supply and the flattening for the second layer of slurry may not be started at the intended timing depending on the rotation speed of the rotating body 10. For this reason, the additive manufacturing apparatus 1 may perform control in such a way as to stop the rotation of the rotating body 10 at timing of starting the supply and the flattening for the second layer of slurry, move the supply unit 30 and the flattening unit 50 in the direction away from the rotating body 10 by one layer, and then resume the rotation of the rotating body 10.

Alternatively, the additive manufacturing apparatus 1 may include two sets of a supply unit 30 and a flattening unit 50 disposed in parallel. For example, the additive manufacturing apparatus 1 may include a supply unit 30 and a flattening unit 50 on an upstream side and a supply unit 30 and a flattening unit 50 on a downstream side. By moving the two sets of the supply unit 30 and the flattening unit 50 at different timings, the additive manufacturing apparatus 1 starts the supply and the flattening for the second layer of slurry at the intended timing. More specifically, the supply unit 30 and the flattening unit 50 on the upstream side are disposed so that the end portions thereof become the height position of the upper layer 201 (second layer) of slurry and the supply unit 30 and the flattening unit 50 on the downstream side are disposed so that the end portions thereof become the height position of the layer 200 (first layer) of slurry. In this case, the slurry supplied to the first layer by the supply unit 30 on the upstream side is flattened by the flattening unit 50 on the upstream side to become the second layer. By taking advantage of the time for the slurry becoming the second layer to reach the supply unit 30 and the flattening unit 50 on the downstream side, the supply unit 30 and flattening unit 50 on the downstream side can move in a direction away from the rotating body 10. In this way, the additive manufacturing apparatus 1 can perform the supply and the flattening for the second layer of slurry at the intended timing.

Alternatively, the supply unit 30 and the flattening unit 50 may be configured to be movable in the rotating direction R of the rotating body 10. In this case, the additive manufacturing apparatus 1 can adjust a relative speed in the rotating direction R between the supply unit 30 and the flattening unit 50 and the rotating body 10. Thereby, the additive manufacturing apparatus 1 can relatively stop the rotation of the rotating body 10 when viewed from the supply unit 30 and the flattening unit 50 at timing of starting the supply and flattening for the second layer of slurry. In this way, the additive manufacturing apparatus 1 can eliminate a time lag between the timing of completing the movement for the flattening of the flattening unit 50 and the timing of starting the supply and flattening for the second layer of slurry.

The irradiation unit 70 according to the first embodiment need not be provided with the light reflecting members 72 and 74. That is, the irradiation unit 70 may not have the function of changing the position of the irradiation point 70a and may directly irradiate the slurry layer 200 with ultraviolet light emitted from the optical unit 71. In this case, the additive manufacturing apparatus 1 may have a movement mechanism to move the optical unit 71 of the irradiation unit 70. For example, the additive manufacturing apparatus 1 according to the first embodiment has a movement mechanism to move the irradiation unit 70 in the center line direction D. This movement mechanism allows the irradiation unit 70 to irradiate the slurry layer 200 with ultraviolet light at all the irradiation positions 210.

The rotating body 10 according to the second embodiment may be provided with a storage container storing the uncured slurry, liquid or gas discharged from the inner circumferential surface 11 of the rotating body 10. The storage container may be configured to rotate together with the rotating body 10 or configured to be fixed in such a way as to come closer to the left end face 12 and the right end face 13. The uncured slurry collected in the storage container is reused. The liquid or gas collected in the storage container is discarded. The uncured slurry and the liquid or gas may be collected in different storage containers. The rotating body 10 according to the second embodiment may rotate in a direction opposite to the rotating direction R. The nozzle 81 according to the second embodiment may relatively rotate with respect to the rotating body 10 in the rotating direction R or in a direction opposite to the rotating direction R. The nozzle 81 according to the second embodiment may separate slurry from the molded object by sucking the slurry on the inner circumferential surface 11 of the rotating body 10.

DESCRIPTION OF THE NUMERALS 1, 1A . . . additive manufacturing apparatus, 10 . . . rotating body, 11 . . . inner circumferential surface, 20 . . . rotation drive unit, 30 . . . supply unit, 40 . . . first drive unit, 50 . . . flattening unit, 60 . . . second drive unit, 70 . . . irradiation unit, 70a . . . irradiation point, 81 . . . nozzle, 100, 100A . . . controller, 210 . . . irradiation position, C . . . radial direction, M . . . axis of rotation, MT . . . additive manufacturing method, R . . . rotating direction.

What is claimed is:

1. An additive manufacturing apparatus forming a molded object layer by layer, comprising:
a rotating body including therein a space defined by an inner circumferential surface and an axis of rotation extending in a direction along a center line of the inner circumferential surface;
a rotation drive unit configured to cause the rotating body to rotate around the axis of rotation;
a supply unit provided inside the rotating body and configured to supply slurry containing ultraviolet light curable resin to the inner circumferential surface of the rotating body during rotation of the rotating body by the rotation drive unit;
a first drive unit configured to cause the supply unit to move in a radial direction of the rotating body;
a flattening unit provided inside the rotating body, located downstream of the supply unit in a rotating direction of the rotating body and configured to flatten the slurry supplied to the inner circumferential surface of the rotating body at an end portion thereof during rotation of the rotating body by the rotation drive unit to a thickness of one layer;
a second drive unit configured to cause the flattening unit to move along the radial direction of the rotating body;
an irradiation unit provided inside the rotating body, located downstream of the flattening unit in the rotating direction of the rotating body and configured to perform spot-radiation with ultraviolet light at an irradiation position determined based on a shape of the molded object during rotation of the rotating body by the rotation drive unit; and
a nozzle provided inside the rotating body, separate from the supply unit and configured to supply a liquid or gas toward the inner circumferential surface of the rotating body after the spot-radiation to separate the uncured slurry from the molded object.

2. The additive manufacturing apparatus according to claim 1, wherein the irradiation unit completes irradiation corresponding to one layer of the molded object after irradiation with ultraviolet light starts until the rotating body makes one rotation based on a rotation speed of the rotating body by the rotation drive unit and the irradiation position.

3. The additive manufacturing apparatus according to claim 1, wherein the irradiation unit changes an ultraviolet light irradiation position based on a rotation speed of the rotating body by the rotation drive unit and the irradiation position for every rotation of the rotating body along the center line of the inner circumferential surface of the rotating body and completes irradiation corresponding to one layer of the molded object.

4. The additive manufacturing apparatus according to claim 1, wherein the liquid is a cleaning liquid.

5. The additive manufacturing apparatus according to claim 4, wherein the cleaning liquid includes at least one of an organic solvent, acrylic monomer, and epoxy monomer.

6. The additive manufacturing apparatus according to claim 1, further comprising:
a pump arranged coaxially with the rotating body; and
a pipe extending from the pump toward the inner circumferential surface of the rotating body,
wherein the nozzle is provided at a tip of the pipe.

7. The additive manufacturing apparatus according to claim 6, wherein the pump rotates relative to the rotating body about the axis of rotation.

8. An additive manufacturing method forming a molded object layer by layer, comprising:
causing a rotating body including therein a space defined by an inner circumferential surface and an axis of rotation extending in a direction along a center line of the inner circumferential surface to rotate around the axis of rotation;
supplying slurry containing ultraviolet light curable resin to the inner circumferential surface of the rotating body during rotation of the rotating body;
flattening the slurry supplied to the inner circumferential surface of the rotating body in the supplying during rotation of the rotating body to a thickness of one layer;

spot-irradiating the slurry flattened on the inner circumferential surface of the rotating body in the flattening during rotation of the rotating body with ultraviolet light at an irradiation position determined based on a shape of the molded object; and supply a liquid or gas toward the inner circumferential surface of the rotating body during rotation of the rotating body after the spot-irradiating to separate the uncured slurry from the molded object.

\* \* \* \* \*